United States Patent [19]
Needham et al.

[11] Patent Number: 5,623,589
[45] Date of Patent: Apr. 22, 1997

[54] METHOD AND APPARATUS FOR INCREMENTALLY BROWSING LEVELS OF STORIES

[75] Inventors: Bradford H. Needham, Hillsboro; Edward R. Harrison, Beaverton, both of Oreg.

[73] Assignee: Intel Corporation, Santa Clara, Calif.

[21] Appl. No.: 414,446

[22] Filed: Mar. 31, 1995

[51] Int. Cl.⁶ .................................................. G06F 3/00
[52] U.S. Cl. ........................ 395/160; 395/352; 395/340; 395/806
[58] Field of Search ................................ 395/155–161, 395/154, 600; 364/188; 345/117–120; 348/7, 12, 13

[56] References Cited

U.S. PATENT DOCUMENTS

| | | | |
|---|---|---|---|
| 4,740,912 | 4/1988 | Whitaker | 395/155 |
| 5,179,654 | 1/1993 | Richards et al. | 395/157 |
| 5,341,466 | 8/1994 | Perlin et al. | 395/139 |
| 5,388,196 | 2/1995 | Pajak et al. | 395/161 X |
| 5,454,073 | 9/1995 | Fukushima et al. | 395/158 |
| 5,500,929 | 3/1996 | Dickinson | 395/160 |
| 5,504,853 | 4/1996 | Schuur et al. | 395/160 |
| 5,524,193 | 6/1996 | Covington et al. | 395/154 |
| 5,524,195 | 6/1996 | Clanton, III et al. | 395/155 |
| 5,539,869 | 7/1996 | Spoto et al. | 395/154 |
| 5,544,354 | 8/1996 | May et al. | 395/154 X |
| 5,555,354 | 9/1996 | Strasnick | 395/160 X |

*Primary Examiner*—Mark R. Powell
*Assistant Examiner*—John E. Breene
*Attorney, Agent, or Firm*—Blakely, Sokoloff, Taylor & Zafman

[57] ABSTRACT

A method and apparatus for displaying information in a computer system. The computer system includes a processor coupled to a memory. The computer system includes a display coupled to the processor. The memory stores a plurality of stories. The method comprises the following steps. One step involves displaying a plurality of first levels of information corresponding to the plurality of stories in a first area of the display. Another step includes displaying a first level of information of a first story of the plurality of stories in a first subarea of the first area. Another step includes detecting a selector within the first subarea and displaying a second level of information of the first story within the first subarea responsive to the detecting the selector within the first subarea. Another step is a step of detecting a selection within the first subarea and displaying a third level of information of the first story within said first area.

20 Claims, 7 Drawing Sheets

METHOD AND APPARATUS FOR INCREMENTALLY BROWSING LEVELS OF STORIES

BACKGROUND OF THE INVENTION

1. Field of Invention

The invention relates to the field of information access and display. In particular, the invention describes a method and apparatus for browsing structured objects such as stories.

2. Description of Related Art

Computer systems can now access many types of information from many different sources. However, presenting that information in a coherent manner to a user has become a challenging task. A user, using a standard personal computer, can access information, such as stories, from many services. For example, video stories and audio stories can be accessed from CNN Headline News, text stories can be accessed from Associated Press' news wire. The stories can include text, photos, video clips, and audio clips. Presenting this information to the user in a manner that allows easy review has not been adequately addressed by prior art systems.

Some prior art systems operate like an electronic mail browser. Stories are presented in a simple list. A user selects a story by clicking on a title of a story. The body of the story is then displayed in a separate window. The user loses his or her sense of context, and his or her focus having to look from the titles of the stories window to the full text window. This makes browsing difficult for the user.

Other systems have provided a newspaper like layout for the user. Headlines and at least the beginning of the story are displayed. However, this limits the number of stories that can be put on a page because screen real estate is limited in most display devices. Therefore, users find it difficult to browse a great number of stories in such a system. Also, the display has an undesirable crowded and cluttered look to it.

In other systems, such as the help features in some software such as the balloon help supported in the Apple Macintosh, the computer displays some text when a user moves a cursor over an item on the display screen. However, this is all the information that is presented to the user. Typically, in such systems the user cannot easily access more information on the topic. Such a system does not work well for information that supports more than two levels of abstraction, such as stories. For example, a story can be broken into a title, a summary of the story, and then the rest of the story.

Therefore, what is needed is a method and apparatus that allows a user to easily browse objects that support multiple levels of information such as stories.

SUMMARY OF THE INVENTION

A method and apparatus for incrementally browsing structured objects such as stories is described.

A method and apparatus for displaying information in a computer system. The computer system includes a processor coupled to a memory. The computer system includes a display coupled to the processor. The memory stores a plurality of stories. The method comprises the following steps. One step involves displaying a plurality of first levels of information corresponding to the plurality of stories in a first area of the display. Another step includes displaying a first level of information of a first story of the plurality of stories in a first subarea of the first area. Another step includes detecting a selector within the first subarea and displaying a second level of information of the first story within the first subarea responsive to the detecting the selector within the first subarea. Another step is a step of detecting a selection within the first subarea and displaying a third level of information of the first story within said first area.

Although a great deal of detail has been included in the description and figures, the invention is defined by the scope of the claims. Only limitations found in those claims apply to the invention.

BRIEF DESCRIPTION OF THE DRAWINGS

The invention is illustrated by way of example, and not limitation, in the figures. Like references indicate similar elements.

DESCRIPTION OF THE PREFERRED EMBODIMENT

Overview of One Embodiment of the Invention

A method and apparatus for incrementally browsing structured objects such as stories is described. In the following description, specific details are set forth such as story structures, issues structures, etc., in order to provide a thorough understanding of the invention. In other instances, known circuits, structures and techniques have not been shown in detail in order not to obscure the invention.

In one embodiment of the invention, a computer system displays information using a multilevel presentation. The multilevel approach makes browsing the information simpler. In one embodiment, a first level of information is displayed for a number of stories. A user browses stories simply by moving a cursor over the display area to show a second level of information about a story. To see a third level of information, the user makes a selection in an area pertaining to a story.

An important aspect of one embodiment of the invention is that the layout on the display does not change significantly when the second level of information is displayed. It has been found that a user loses his or her context (focus) if the layout changes too dramatically.

In one embodiment, the first level of information includes a title and a thumbnail of a picture or a video for a story. The second level of information includes displaying a brief textual summary of the story. In another embodiment, where the story is accompanied by an audio track, a portion of the audio track is played. The third level of information includes the full text of the story, a higher resolution picture, the complete video, or the complete audio track.

Computer System

Figure 1:
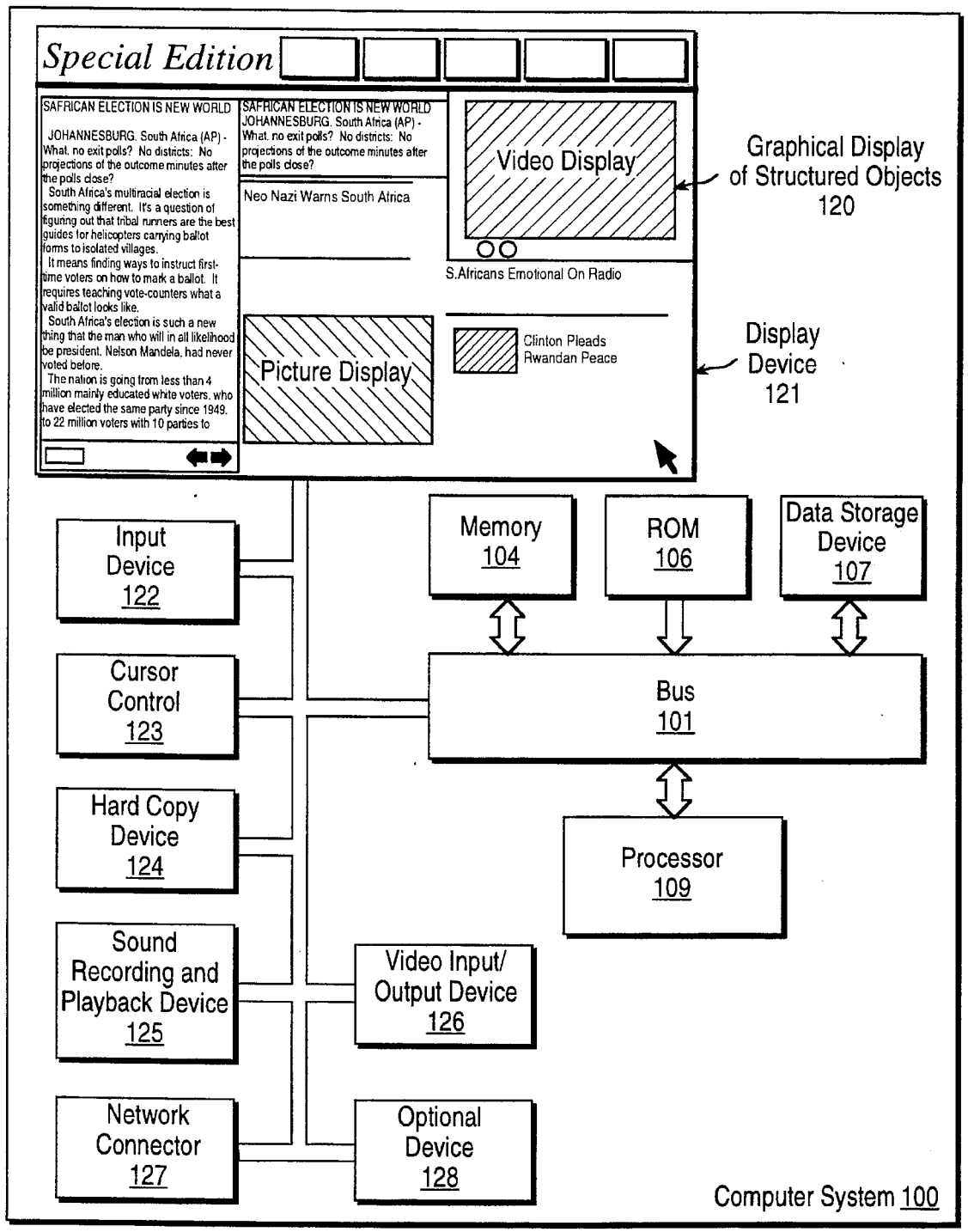
FIG. 1 illustrates a computer system upon which one embodiment of the invention can be implemented.

FIG. 1 illustrates a computer system 100 upon which an embodiment of the invention can be implemented. Computer system 100 includes a bus 101, or other communications hardware and software, for communicating information, and a processor 109 coupled with bus 101 for processing information. Processor 109 can be a single processor or a number of individual processors that can work together. Computer system 100 further includes a memory 104. Memory 104 can be random access memory (RAM), or some other dynamic storage device. Memory 104 is coupled to bus 101 and is for storing information and instructions to be executed by processor 109. Memory 104 also may be used for storing temporary variables or other intermediate information during execution of instructions by processor 109. Computer system 100 also comprises a ROM 106 (read only memory), and/or some other static storage device, coupled to bus 101. ROM 106 is for storing static information.

Computer system 100 can optionally include a data storage device 107, such as a magnetic disk, a digital tape system, or an optical disk and its corresponding disk drive. Data storage device 107 can be coupled to computer system 100 via bus 101.

Computer system 100 can also include a display device 121 for displaying information to a computer user. Display device 121 can be coupled to bus 101. Display device 121 can include a frame buffer, specialized graphics rendering devices, a cathode ray tube (CRT), and/or a flat panel display. Bus 101 can include a separate bus just for display device 121. In this embodiment, display device 121 includes a graphical display of structured objects 120. The graphical display of structured objects 120 allows a user to easily browse and review structured information such as stories.

An alphanumeric input device 122, including alphanumeric and other keys, is typically coupled to bus 101 for communicating information such as command selections to processor 109 from a user. Another type of user input device is cursor control 123, such as a mouse, a trackball, a pen, a touch screen, a touch pad, a digital tablet, or cursor direction keys for communicating direction information to processor 109, and for controlling cursor movement on display device 121. This input device typically has two degrees of freedom in two axes, a first axis (e.g., x) and a second axis (e.g., y), which allows the device to specify positions in a plane. However, this computer system is not limited to input devices with only two degrees of freedom.

Another device which may be optionally coupled to bus 101 is a hard copy device 124 which may be used for printing instructions, data, or other information on a medium such as paper, film, slides, or other types of media.

A sound recording and/or playback device 125 can optionally be coupled to bus 101. For example, sound recording and/or playback device 125 can include an audio digitizer coupled to a microphone for recording sounds. Further, sound recording and/or playback device 125 may include speakers which are coupled to a digital to analog (D/A) converter for playing back sounds.

A video input/output device 126 can optionally be coupled to bus 101. This video input/output device 126 can be used to digitize video images from, for example, a TV, a VCR, and/or a video camera. Video input/output device 126 can include a scanner for scanning printed images.

Also, computer system 100 can be part of a computer network (e.g., a LAN) using the optional network connector 127 being coupled to bus 101. In one embodiment of the invention, the entire network can then also be considered to be part of computer system 100.

Optional device 128 can optionally be coupled to bus 101. Optional device 128 can include, for example, a PCMCIA card adapter. The optional device 128 can further include an optional device such as modem or a wireless network connection.

Example of Browsing Structured Objects

Figure 2:
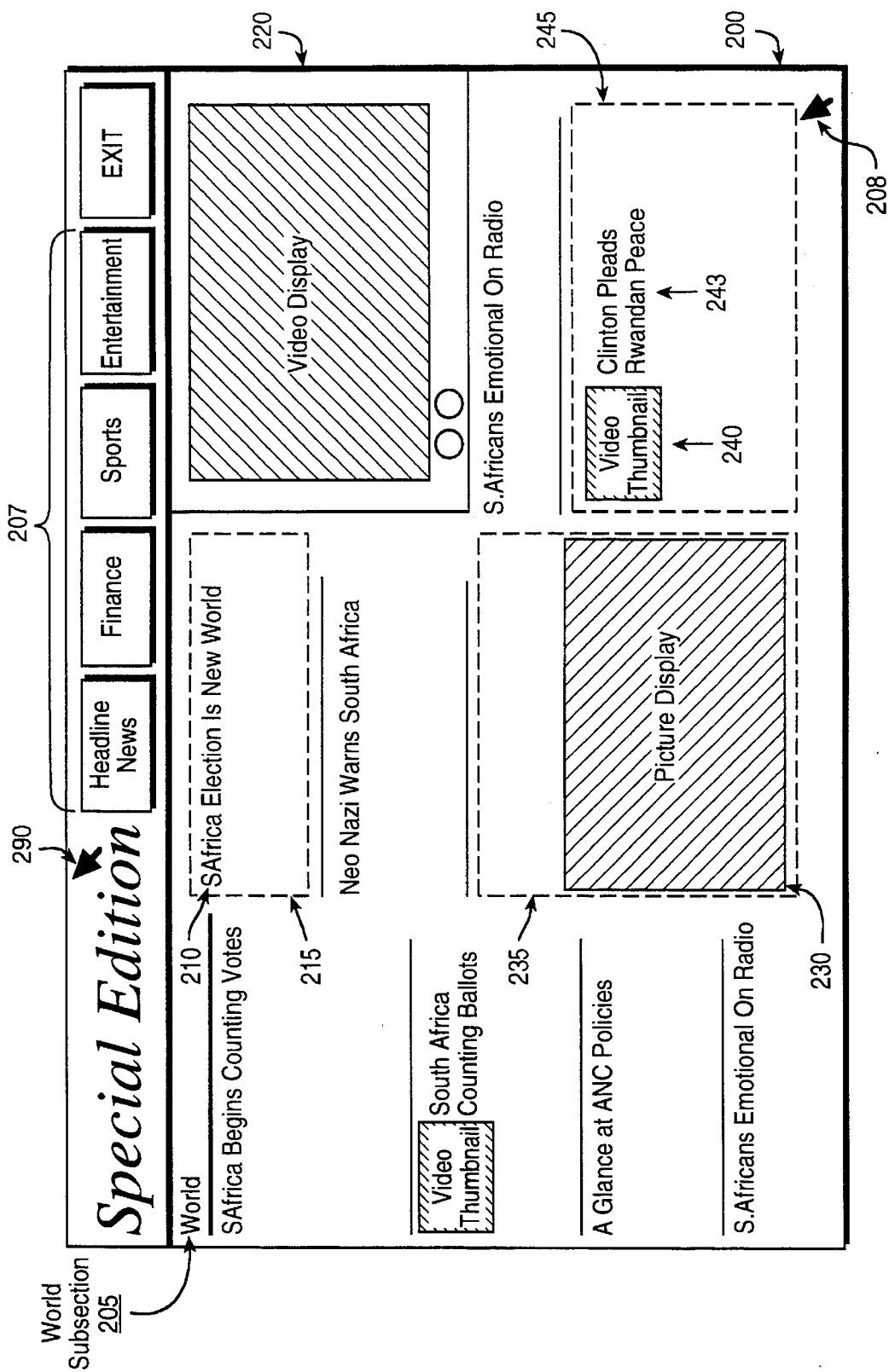
FIG. 2 illustrates a view of browsing structured objects.

FIG. 2 illustrates one embodiment of a view of browsing structured objects. This embodiment can be implemented using the computer system of FIG. 1. Processor 109 executes software instructions that are stored in one of the memories. The information is then displayed on display device 121 as the graphical display of structured objects 120. Some or all of the instructions could be optionally implemented in circuitry.

Display area 200 represents the output of the display device 121. What is being output is a portion of an issue. The issue describes the format by which stories can be displayed on the screen. The issue describes which stories are to be displayed and where they are to be displayed. For example, an issue may have a headline news section, a finance section, a sports section and a entertainment section. As shown by sections 207, the user can select the section that is to be displayed by selecting the appropriate section button. In the example shown in FIG. 2, a headline news section is being displayed. A user can scroll to the next subsection by selecting the scroll button 208. The world subsection 205, in this example, includes a number of stories about South Africa.

Different types of stories are displayed. For example, a text story is displayed in text story area 215. A picture is displayed in picture story area 235. Video information is displayed in video story area 245.

The display area 200 also includes other elements, a cursor 290 and a video display area 220. For FIG. 2, it is important to note the cursor 290 is not within any story areas. The reason this is important is that when the cursor 290 is within a story area, a second level of information for the corresponding story can be displayed.

Each story is associated with a corresponding area on the display and has some first level of information that is continuously displayed. For example, a text story has a text title 210. This corresponds to an abbreviated version of the title of that story. In another embodiment, the entire title of the story is included. For a picture story, a reduced picture is shown in the picture story area 235. For example, in picture story area 235, the reduced picture 230 is shown. Optionally, an abbreviated caption is included in the picture story area 235. For a video story, a thumbnail picture of the video is displayed. This is, for example, shown by thumbnail 240. Optionally, a portion of a caption can be shown with the thumbnail 240, for example caption 243.

Note that the screen is not cluttered with an overwhelming amount of textual information. Rather the display area 200 has an overall appearance of the titles of a newspaper. However, the display area 200 includes more stories than could normally be displayed if a complete newspaper look was used.

Figure 3:
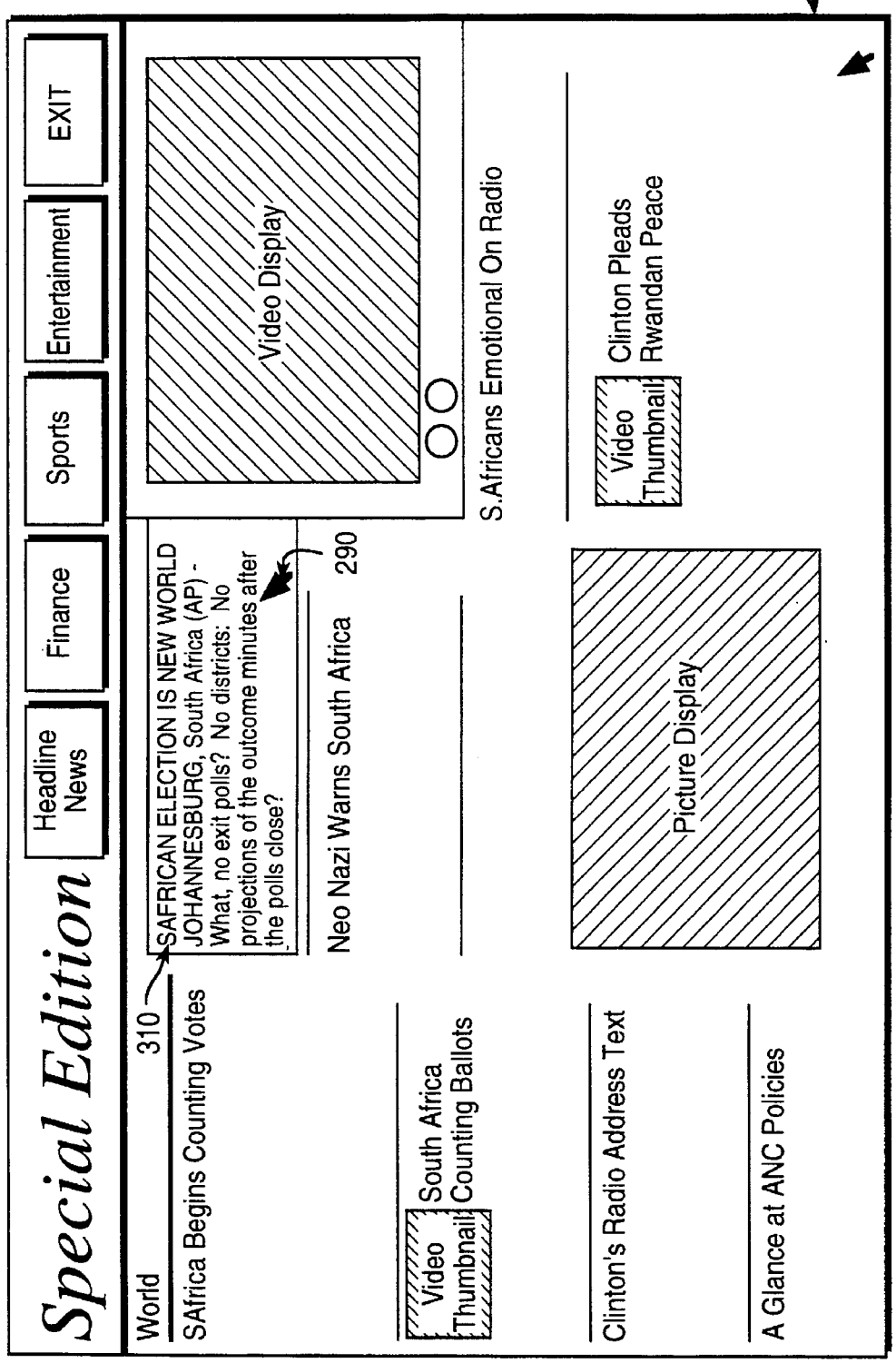
FIG. 3 illustrates a view of browsing a second level of a structured object.

FIG. 3 is a view of browsing a second level of a structured object. This can be implemented on the computer system 100 as can the example of FIG. 2.

In example of FIG. 3, the cursor 290 has been moved into the text story area 215. The processor 109 detects that the cursor has been moved within the text story area 215. Typically, this is done by a user using input device 122. The text story area 215 displays a summary of the text story. In one embodiment of the invention, we have found it convenient to use the structure of stories in displaying the second level of information 310. Most stories are written such that the first sentence, or first paragraph, gives a brief overview or summary of the text story. Therefore, in one embodiment we include the first few sentences of a text story in the text story area 215. Note that no other areas on the display area 200 display additional text story information. This helps keep the screen free of clutter and allows the user to focus on the his or her area of interest.

In one embodiment, the user does not have to select (click) within the text story area 215. Rather, the user merely moves the mouse between the various areas on the screen to display the second level of information 310. This allows the user to quickly browse a second level of information for each of the stories.

The second level of information 310 can be included for any of the stories, be they textual, graphical, such as a picture story or the video stories, or audio.

In another embodiment, where audio information is associated with the story, for example a video story, or a radio story, then the second level of information 310 can be corresponding text information and/or the beginning of the audio information. A user moving a mouse between different areas associated with audio information would then hear the beginnings of the audio stories. The effect would be similar to tuning a radio; each story area would be a different channel on the radio.

Figure 4:
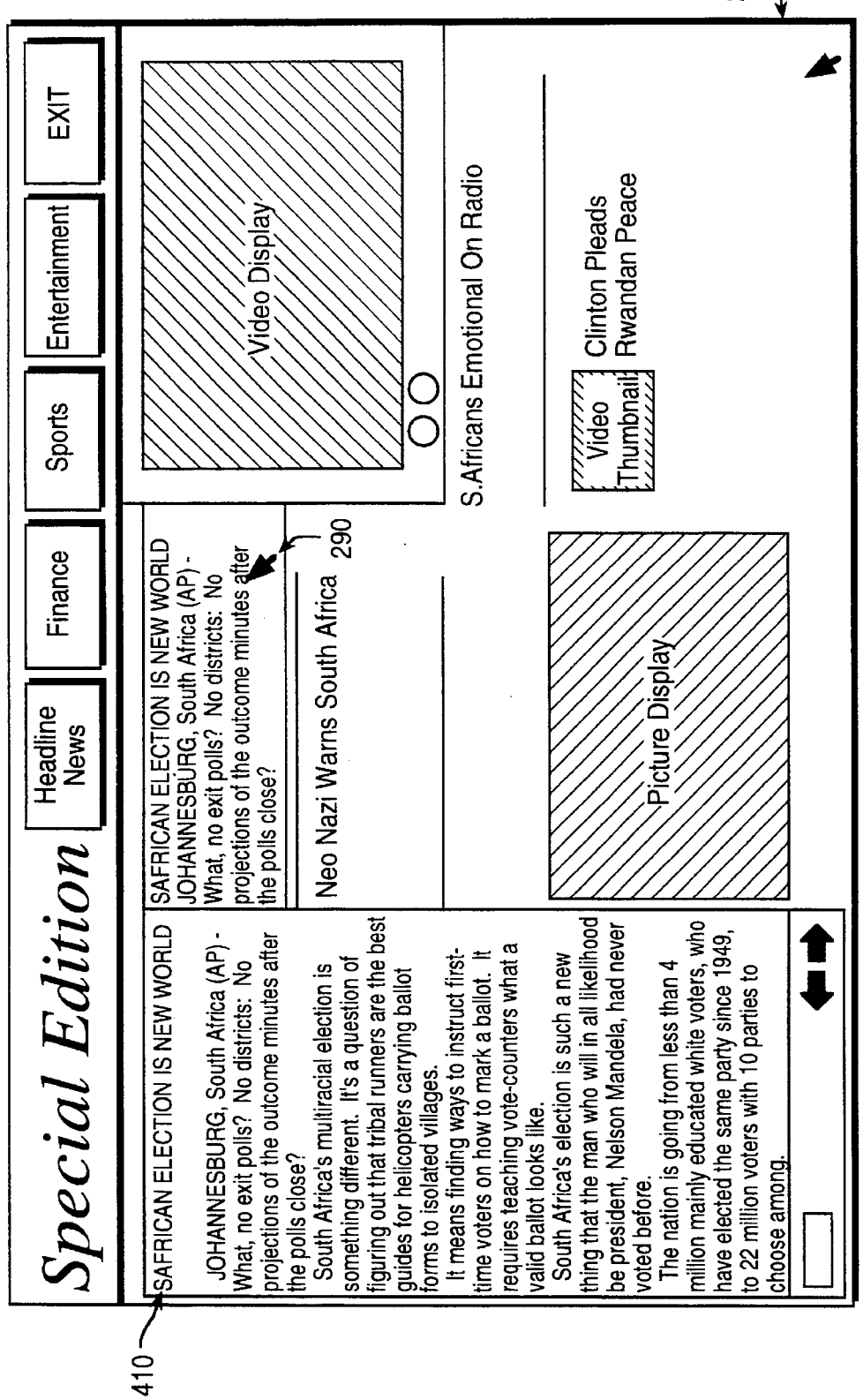
FIG. 4 illustrates a view of browsing a third level of a text object.

FIG. 4 illustrate a view of browsing a third level of a text object. The third level of information of the story is displayed when the user makes a selection (e.g. double clicks or single clicks) in the story area. For example, body of the story 410 is displayed when the user single clicks in the text story area 215. The body of the story 410 includes the complete text of the story. A user can scroll through the story if not all of it will fit on the screen. Note that the story is displayed close to where the text story area 215 is displayed. This helps the user keep his or her focus while browsing. In another embodiment, the text story area 215 is actually expanded to support the body of the story 410.

Figure 5:
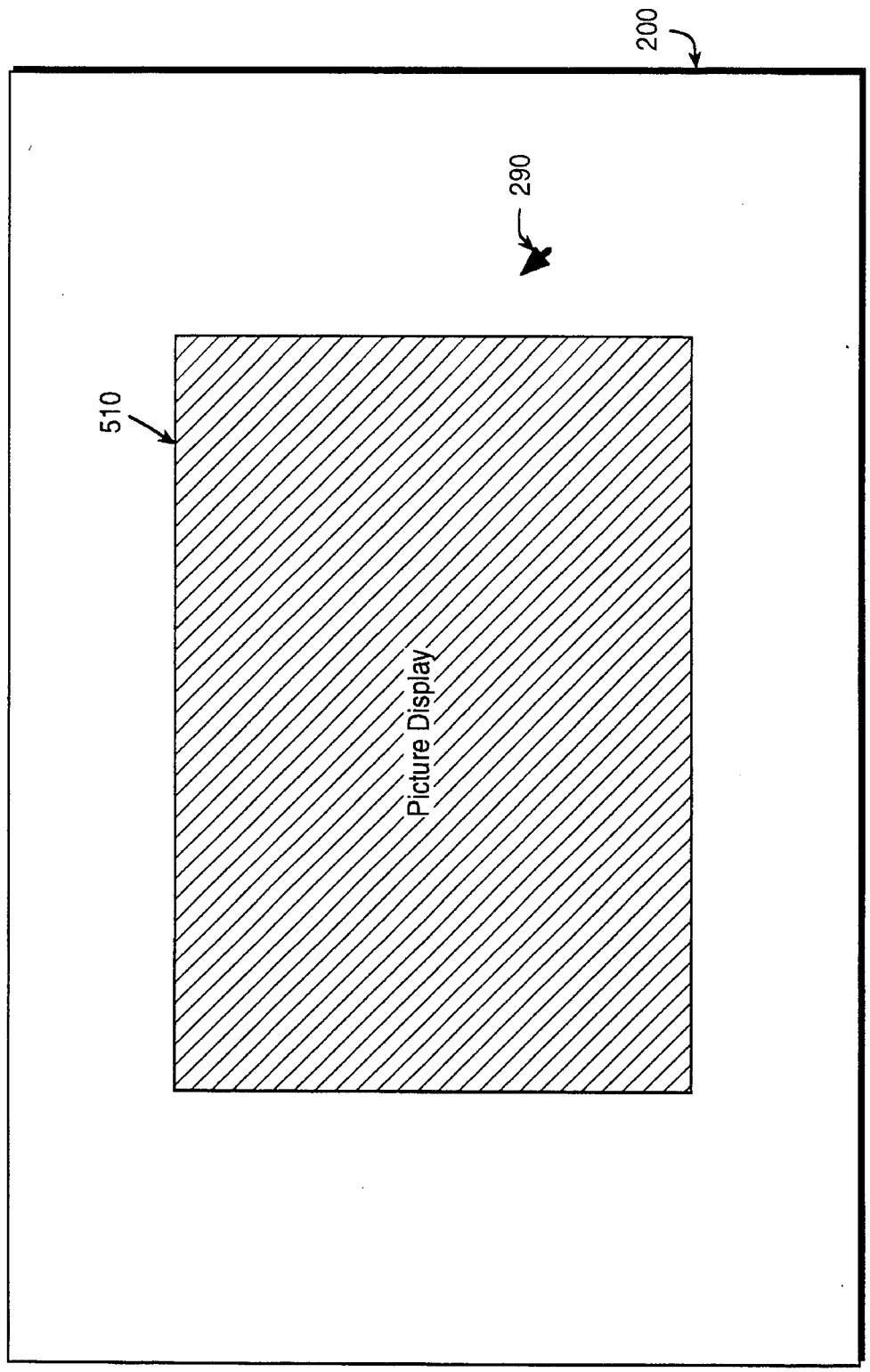
FIG. 5 illustrates a view of browsing a third level of a picture object.

FIG. 5 illustrates a view of browsing a third level of a picture object. For example, if the user single clicks in the picture story area 235, then picture 510 is displayed. In one embodiment, the screen is blanked out and then the picture 510 is displayed. In another embodiment, the picture is just displayed on top of the other information in the subsection.

Figure 6:
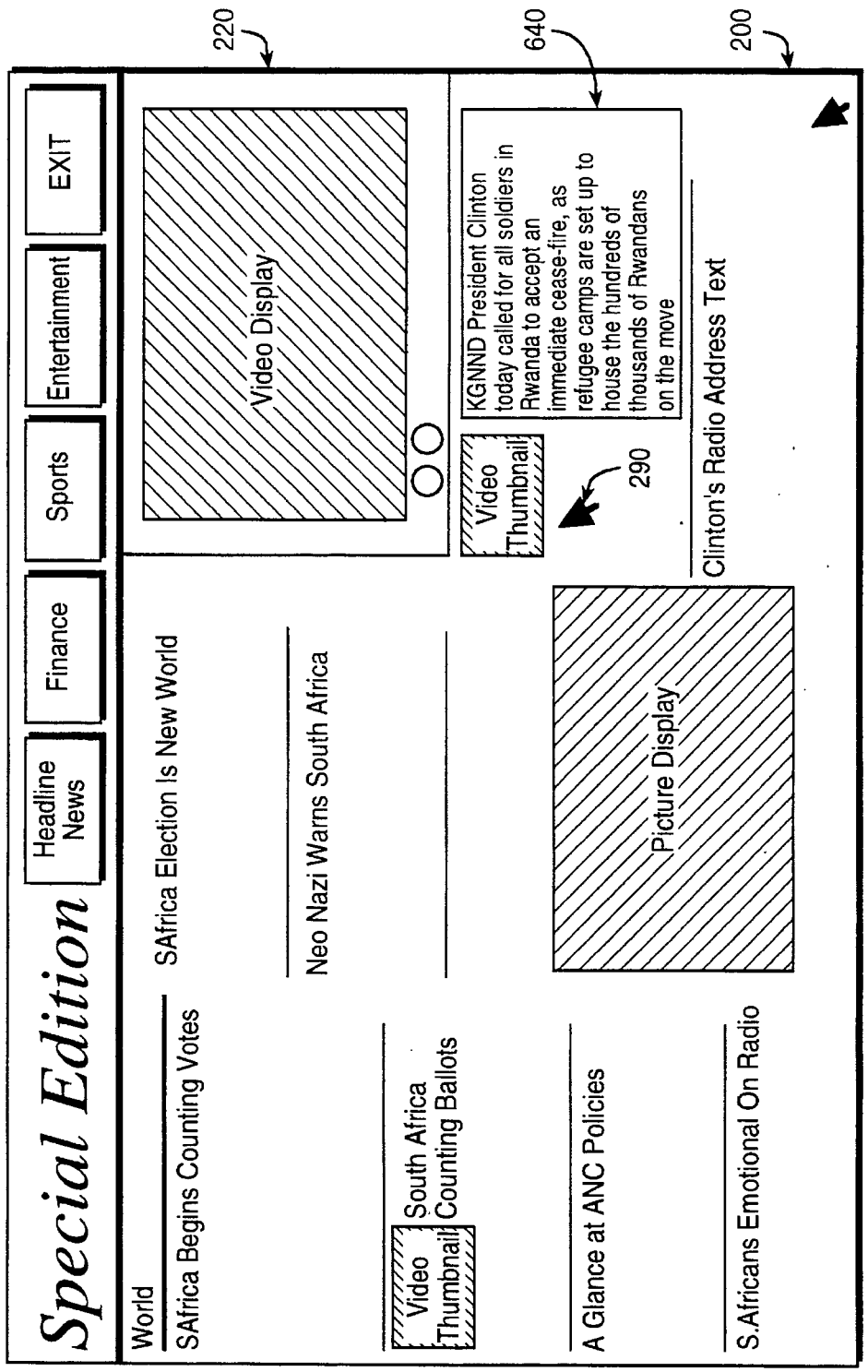
FIG. 6 illustrates a view of browsing a third level of a video object.

FIG. 6 illustrates a view of browsing a third level of a video object. When a user single clicks in the video story area 245, a video corresponding to the thumbnail 240 is displayed in video display area 220. Note also that the summary 640 is also included in the video story area 245. In another embodiment, the video is displayed in an area near, or within, the video story area 245.

Thus a user can browse information in an issue by simply moving the mouse from one area to the next. Different levels of information are displayed depending on whether the cursor is in a defined area and whether the computer system 100 has detected a click of the mouse.

Displaying the Structured Information

Processor 109 manipulates a number of data structures to provide the graphical display of the structured objects 120. Stories are arranged as structured objects. An issue defines how these stories will be displayed on the display device 121. Each of the stories and the issues can be stored in the memory 104, the data storage device 107, or on another device of a network coupled to network connector 127.

For text stories, the processor 109 takes advantage of how stories are typically written. That is, a text story typically has a title and a description in the first sentence of the story. The first paragraph of the text story typically summarizes the rest of the story. Alternatively, for each text story, a separate abstract can be stored with the text story. The first level of information would then be the title. The second level of information is the summary of the story. The third level of information includes the full text, or body, of the text story.

For photo stories, a summary text can be included with the photo story. Alternatively, a reduced version of the photo can be used as the summary. Thus, the first level of information is the title, if available, and a reduced version of the photo story. The second level of information is the text summary of the photo story. The third level of information is the full sized photo.

For video stories, the first level of information typically includes a thumbnail sketch and a headline for the story. The second level of information can include a textual summary of the video story. Both the title and the summary could be taken from a closed captioned transmission of the video story. The second level of information can include an audio clip from the audio track of the video story. The audio clip can be played when a user moves over the video story area 245. The third level of information includes the complete video story. In one embodiment, the video is displayed in the video display area 220.

For an audio story, the first level of information typically includes a text title of the audio story. The second level of information can include a text summary of the audio story and possibly an audio summary of the audio story. The third level of information typically includes the complete audio story.

Other types of structured objects can be displayed in an issue. For example, information about a computer file can be displayed. The first level of information may be the title of the file. The second level of information may include the size of the file and/or an estimated time to retrieve the file. The third level of information may be the actual file. Thus, the browsing of structured objects described can be used in, for example, a World Wide Web browsing environment.

As mentioned above, the issue defines how the stories are displayed. An issue can be designed by hand using a process analogous to laying out a newspaper. Each structured object is defined by a position on the display area 200. Each structured object is given a corresponding area on the display area 200, called a story area.

In one embodiment, an issue is created automatically from the stories to be displayed. The areas for the display of each story are chosen by the area required to display the first sentence for each story, the size of the reduced size photo, or the area of the thumbnail of the video. In another embodiment, the area for display of each story is also defined by the area needed to display the second level of information for a story.

Figure 7:
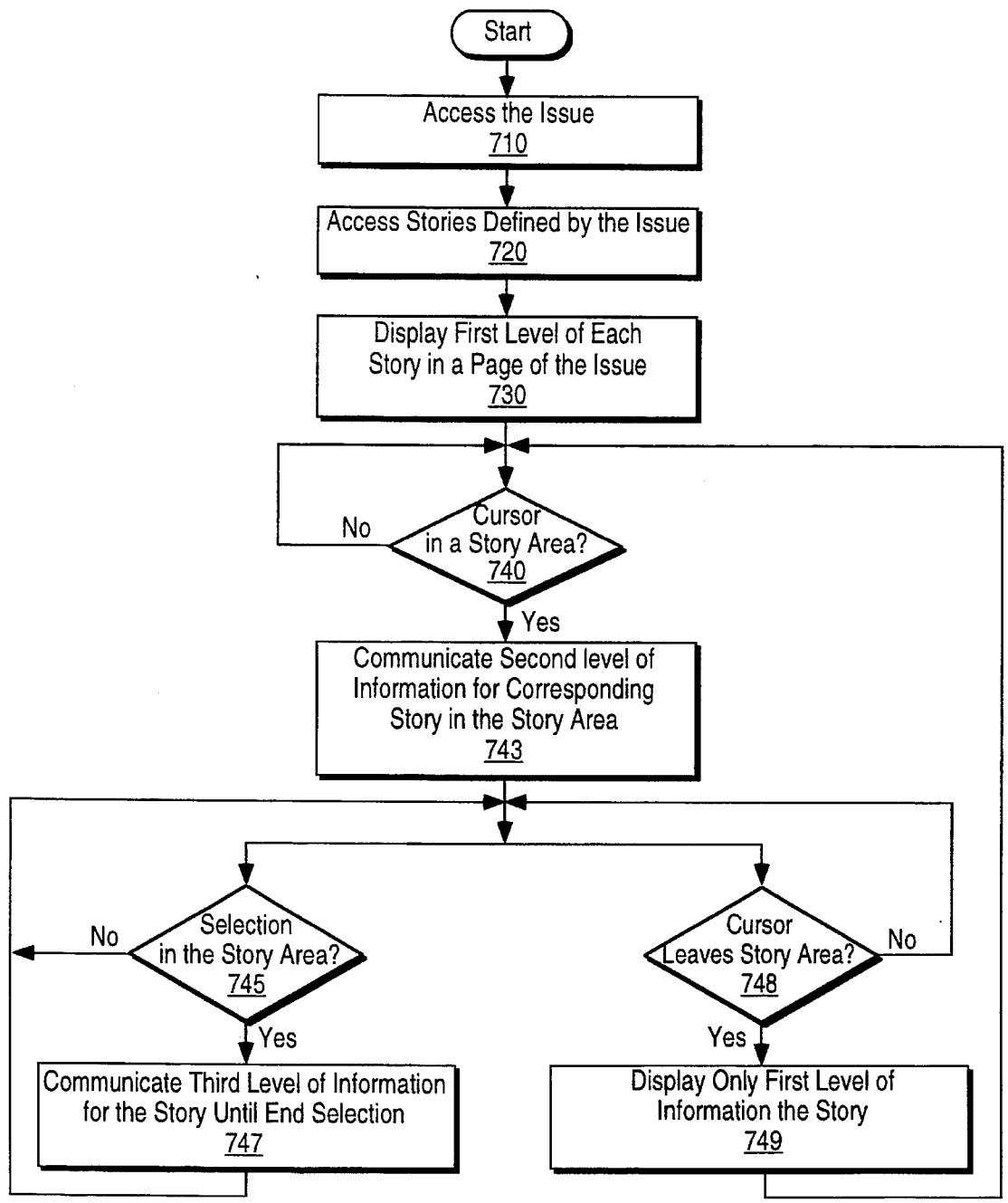
FIG. 7 illustrates one embodiment of a method of browsing structured objects.

FIG. 7 illustrates one embodiment of a method of browsing structured objects.

At step 710, processor 109 accesses a particular issue.

At step 720, processor 109 determines, from the accessed issue, which stories are to be displayed. These stories are accessed from storage.

At step 730, the first level corresponding to each story is displayed on the display device 121. FIG. 2 illustrates the results of step 710 through step 730.

At step 740, a test is made to determine whether a cursor is within a story area. If the cursor is within a story area, then step 743 is executed. Otherwise, step 740 is repeated.

At step 743, the second level of information for the story corresponding to the story area of step 740 is communicated. Communicating the second level of information typically includes displaying a summary of the corresponding story in the story area and/or playing a portion of an audio clip corresponding to the story.

At step 745, a test is made to determine whether a selection in the story area has been made. If no selection has been made, only the second level of information is displayed.

At step 747 a selection has been made within the story area. This causes the third level of information to be communicated to the user for the corresponding story. This third level of information is communicated until the selection ends. Typically, communicating the third level of information includes displaying the body of a text story, displaying a full sized photo, displaying a video, or playing the audio story.

At step 748 a test is made to determine whether the cursor has left the story area. If the cursor has left the story area, then at step 749 only the first level of information for the corresponding story is displayed. The process then returns to step 740.

A method and apparatus for incrementally browsing structured objects such as stories has been described.

What is claimed is:

1. A method of displaying information in a computer system, said computer system including a processor coupled to a memory, said computer system including a display coupled to said processor, said memory storing a plurality of stories, said method comprising the steps of:

displaying a plurality of first levels of information corresponding to said plurality of stories in a first area of said display;

displaying a first level of information of a first story of said plurality of stories in a first subarea of said first area;

detecting a selector within said first subarea;

displaying a second level of information of said first story within said first subarea responsive to said detecting said selector within said first subarea;

detecting a selection within said first subarea; and displaying a third level of information of said first story within said first area.

2. The method of claim 1 wherein said displaying said first level of information of said first story includes:

displaying a portion of a title of said first story in said first subarea.

3. The method of claim 2 wherein said displaying said second level of information includes:

displaying said portion of said title in said first subarea and a portion of an abstract of said first story in said first subarea.

4. The method of claim 1 wherein said displaying said third level of information of said first story includes:

displaying a portion of a body of said first story within said first area.

5. The method of claim 1 wherein said detecting said selector within said first subarea includes:

said processor detecting a signal corresponding to a cursor moving within said first subarea.

6. The method of claim 1 wherein said detecting said selection includes:

said processor detecting a signal corresponding to depressing a button on a selection device.

7. The method of claim 1 wherein said displaying said first level of information includes displaying a thumbnail representation of a video corresponding to said first story and wherein said displaying said third level of information includes displaying said video in said first area.

8. The method of claim 1 wherein said displaying said first level of information includes displaying a thumbnail of a picture corresponding to said first story and wherein said displaying said third level of information includes displaying said picture.

9. A method of displaying a first story and a second story on a display device, said display device being coupled to a processor and a memory, said method comprising the steps of:

accessing an issue from said memory, said issue defining a format for displaying said first story and said second story;

displaying a first title of said first story in a first area on said display device, said first area being defined by said issue;

displaying a second title of said second story in a second area on said display device, said second area being defined by said issue, said first area being different from said second area;

communicating a first part of said first story in response to detecting a first signal corresponding to a selector being in said first area at a first time;

communicating a first part of said second story in response to detecting a second signal corresponding to said selector being in said second area at a second time;

communicating a second part of said first story in response to detecting a third signal corresponding to a first selection within said first area, said second part of said first story being larger than said first part of said first story; and communicating a second part of said second story in response to detecting a fourth signal corresponding to a second selection within said second area, said second part of said second story being larger than said first part of said first story.

10. The method of claim 9 wherein said communicating said first part of said first story includes displaying a textual summary of said first story.

11. The method of claim 10 wherein said displaying a summary of said first story includes displaying a first sentence from a body of said first story.

12. The method of claim 9 wherein said communicating said first part of said second story includes playing a portion of an audio clip corresponding to said second story.

13. The method of claim 12 wherein said playing a portion of an audio clip includes playing a portion of an audio track of a video corresponding to said second story.

14. The method of claim 12 wherein said method further comprises the steps of:

discontinuing the communicating of said first part of said first story in response to detecting a signal indicating that said selector is no longer in said first area at a third time.

15. A computer system for displaying information corresponding to a story, said computer system comprising:

a display device;

an input device;

a memory, said memory including a first story and instructions; and a processor being coupled to receive said instructions and to generate signals for said display device, said processor being coupled to receive signals from said input device, said instructions defining a first area on said display device, said instructions defining a first subarea of said first area, said instructions causing a first level of information corresponding to said first story to be displayed in said first subarea at a first time, said instructions causing a second level of information corresponding to said first story to be displayed in said first subarea at a second time and in response to receiving a first signal from said input device, said first signal corresponding to a first selector being within said first area, said instructions causing a third level of information corresponding to said first story to be displayed in said first area at a third time and in response to receiving a second signal from said input device, said second signal corresponding to a first selection within said first area.

16. The computer system of claim 15 further including a port, said port coupled to receive a plurality of stories from a network, said plurality of stories including said first story, said port coupled in communications with said memory.

17. The computer system of claim 15 wherein first level of information includes a title of said first story, wherein said second level of information includes a summary of said first story, and wherein said third level of information includes a body of said first story.

18. The computer system of claim 15 wherein said input device includes a mouse.

19. The computer system of claim 18 wherein said second signal corresponds to a depression of a button on said mouse.

20. The computer system of claim 15 wherein said first selector corresponds to a cursor being displayed on said display device.

* * * * *